W. B. SMITH, Sr.
COKE OVEN.
APPLICATION FILED JULY 1, 1908.

915,630. Patented Mar. 16, 1909.
7 SHEETS—SHEET 1.

Witnesses
Samuel Payne
R. H. Butler

Inventor
William B. Smith Sr.
By H. Everitt Co.
Attorneys

W. B. SMITH, Sr.
COKE OVEN.
APPLICATION FILED JULY 1, 1908.

915,630.

Patented Mar. 16, 1909.
7 SHEETS—SHEET 6.

Witnesses
Samuel Payne
R. H. Butler

Inventor
William B. Smith, Sr.

By H. C. Everett
Attorneys

UNITED STATES PATENT OFFICE.

WILLIAM B. SMITH, SR., OF PITTSBURG, PENNSYLVANIA.

COKE-OVEN.

No. 915,630.

Specification of Letters Patent.

Patented March 16, 1909.

Application filed July 1, 1908. Serial No. 441,604.

*To all whom it may concern:*

Be it known that I, WILLIAM B. SMITH, Sr., a citizen of the United States of America, residing at Pittsburg, in the county of Allegheny and State of Pennsylvania, have invented certain new and useful Improvements in Coke-Ovens, of which the following is a specification, reference being had therein to the accompanying drawing.

This invention relates to coke ovens, and the primary object of my invention is to provide a series of ovens from beneath which coke can be easily and expeditiously removed and discharged into cars and receptacles provided therefor.

A further object of this invention is to provide a retort for the production of coke having a detachable bottom or base that can be readily removed to discharge coke and then replaced to support coal or the raw product within the retort.

A still further object of my invention is to provide a novel coke drawing or discharging apparatus for ovens constructed in accordance with my invention, the apparatus of each oven being independently operated from other ovens arranged in a series, and operated from a source of power common to the series of ovens.

A still further object of my invention is to provide a series of elevated ovens provided with means for removing coke from the bottom of said oven, without breaking or disintegrating the coke.

The invention in its broadest aspect involves positive and reliable means for loading and discharging a coke oven, the construction of the oven being such that immediately upon the coke thereof being discharged, it can be refilled without reconstructing any part of the oven. To this end, I have devised ovens embodying a plurality of structural elements, which when combined provide a safe, durable and highly efficient coke oven.

In the accompanying drawings I have represented and herein I describe, a good form of oven embodying my invention so far as it is concerned with coke, and adapted to effectuate my method of discharging or drawing coke.

The ovens as invented comprehend a combination or assemblage of coöperating instrumentalities, which, broadly considered, is novel as a general combination,—and also comprehend various improvements in the construction of the elements themselves, and various sub-combinations of selected elements.

The principal elements of the invention,— namely, an oven structure, a detachable oven base and car, an elevator, and a universal winch or hoisting car, will be hereinafter separately and specifically described in detail, together with several generic controlling and operating mechanisms, their associated coöperating appliances, and objects accomplished from such a combination of elements.

In the drawings: Fig. 13 is an elevation of the controlling and operating mechanism as carried by one side of the oven, Fig. 14 is an elevation of a brake mechanism, Fig. 15 is a vertical sectional view taken on the line XV of Fig. 13, illustrating the brake mechanism, Fig. 16 is a side elevation of a locking mechanism, Fig. 17 is an enlarged elevation of a single clutch forming part of the controlling mechanism, and Fig. 18 a vertical sectional view of the locking mechanism taken on the line XVI of Fig. 13.

My coke ovens are constructed of non-fusible material and metal, consisting principally of fire brick, fire clay, metallic castings, angle bars, frames, and braces, which are assembled to provide a structure, and when assembled in series occupy a space comparatively small with respect to the present type of bee-hive or oblong oven. In connection with the ovens I employ a novel coke drawing or discharging apparatus, which by virtue of its location permits of ovens being closely grouped. This is accomplished by elevating the ovens a desired height and locating the apparatus beneath the ovens, and it is only essential that car pits or conveyers be located in close proximity to the ovens for removing discharged or drawn coke. The stability and superimposed position of the ovens permits of the coke drawing or discharging apparatus being steadily used without interfering with the loading or filling of the ovens, and the controlling and operating mechanism used in connection with the drawing and discharging apparatus is such that coke dust or similar particles of coke will not interfere with the operation of the same.

The controlling and operating mechanism is assembled at points of safety, whereby the lives of workmen or operators are not endangered when manipulating the apparatus.

Considering the various elements of the invention in detail, reference will first be had to the oven structure. For large coke plants my ovens will be arranged in series or groups, and in some instances to economize in space, one row of ovens will be backed against another row. The ovens are constructed upon suitable foundations and since the ovens of a series or group are identical in construction, I deem it only necessary to describe one of said ovens in detail and will hereinafter consider more than one oven in connection with the controlling and operation mechanism.

Each oven comprises four metallic standards 1, 2, 3 and 4, said standards supporting horizontal rectangular metallic frames 5 and 6 connected by vertical braces 7. The frame 5 supports a base plate 8 and the frame 6 a top plate 9, the former having a large opening 10 formed therein and the latter a small opening 11 normally closed by a lid 12. Between the plates 8 and 9 are constructed the walls of the oven, these walls together with the plates 8 and 9 being built of fire brick, fire clay, or similar non-fusible material. The front wall 13 is provided with an opening 14 normally closed by a pivoted shutter 15, said opening permitting of the coke being leveled within the oven.

The rear wall 16 is provided with an exhaust port 17 communicating with an exhaust flue 18, forming the rear edge of the plate 9. This exhaust flue is adapted to communicate with a stack or chimney 19.

The top plate 9 supports rails 20 upon which a car (not shown) is adapted to travel for depositing coal within the oven, and in order that the shutter 15 can be easily reached, I provide the frame 5 with a gallery 21 reached by steps or a ladder 22.

The horizontal frame 5 is provided with depending flanges 23, these flanges surrounding the opening 10 of the plate 8 and are adapted to receive the detachable oven base or car.

Forming part of the oven structure and supported by standards 2 and 3 is a rail 41 and suspended from said rail by a movable hanger 42 is a gate 43 of a length corresponding to the oven. This gate 43 is employed for stripping coke from the oven base or car as will hereinafter appear.

*A detachable oven base and car.*—Fitting in the depending flanges 23 of the frame 5 is a detachable oven base and car, comprising a body 24 having a covering 25 of non-fusible material, said covering forming the bottom or base of the oven retort 26. The edges of the body of the car are flanged upwardly, as at 27, to fit upon the outer sides of the flanges 23 and form a non-leakable connection between the oven base and the oven structure. Longitudinally of the body 24 are arranged girders 28 supporting bearings 29 for revoluble axles 30. Mounted upon the axles 30 are wheels 31 having central peripheral flanges 32.

The rear edge of the oven base or car is provided with a pivoted latch 32, capable of swinging in one direction and the object of this latch will hereinafter appear.

Secured to the body 24 of the car is a depending casing 33 for a combined lock and tripping mechanism, said lock comprising a keeper 34 for a pivoted hook 35. The tripping mechanism comprises a pivoted latch having a keeper 36 for a depending trip 38 and a rearward extension 39. The rearward extension is engaged by a spring-pressed pivoted arm 40 located in the casings 33, said arm holding the keeper 36 in engagement with the hook 37, until the pivoted hook 36 impinges the arm 40 and releases the extension 39 as will hereinafter appear.

The oven base and car are normally supported by an inclined elevator which will be considered under another caption, the hook shaped lever 35 and hook 37 previously mentioned being elements of this elevator.

*The elevator.*—Directly beneath the coke oven I provide a well 44 and over this well is arranged a plate 45 provided with openings 46 for adjustable supports, said supports comprising sleeves 47 threaded upon depending rods 48 pivotally connected to transverse channel beams 49 forming the body of the elevator. The sleeves 47 are adjusted by inserting a bar or similar instrument (not shown) in openings 50 provided therefor in the sleeves 47. The channel beams 49 are connected together by longitudinal rails 51 arranged in pairs, and providing a track upon which the central flanged wheels 31 of the oven base are adapted to travel.

The elevator in a lowered position is supported at an inclination by the forward ends of the rails 51 resting in sockets 52 provided therefor upon a transverse beam 53, while the rear ends of said rails rest upon a bridge 54 adjustably mounted in standards 55. The standards 55 are U-shaped in cross section, and are provided with adjustable pins 56 adapted to extend through the ends of the bridge and support the same.

The rear ends of the rails 51 are connected together by a yoke 57, said yoke supporting the pivoted hook-shaped lever 35, the rear end of said lever being weighted and provided with a trip arm 58 adapted to rest upon a ledge 59 hinged to the bridge 54. The ledge 59 is normally supported in a horizontal position and is lowered to provide clearance for the winch or hoisting bar as will hereinafter appear.

Mounted upon the bridge 54 is a roller bearing 59ᵃ for the cable of the winch or hoisting car.

In the ends of the channel beams 49 are journaled shafts 60, and upon said shafts are mounted drums 61 to which cables 62 are attached, employed for raising the elevator. The shafts 60 are normally held in a fixed position by ratchet wheels 63 and pawls 64, said drums 61 being wound by placing a crank (not shown) upon the ends of the shafts 60. These drums are provided whereby the tension can be increased upon the cable 62 and the elevator adjusted to support the rails 51 at a desired inclination.

Upon the plate 45 and surrounding the openings 46 are lock casings 65 provided with openings 66 through which the adjustable sleeves 47 protrude. In the lock casings 65 are located pivoted levers 67, and after the elevator has been raised, these levers are swung to close the openings 66 and provide supports for the sleeves 47. The elevator cannot descend until the levers 67 are returned to their normal position.

In conjunction with the rails 51 forming the track of the elevator, other rails 68 are used, these rails bridging a pit 69 in which is arranged a track 70 for cars 71. The oven base or car is adapted to travel outwardly from the rails 68, and when moved inwardly is stripped of the coke thereon by virtue of the gate 43, the coke descending into the car 71 upon the track 70.

The oven base or car is limited in its movement upon the rails 68 by a ledge 72 arranged at the opposite side of the pit 69 from that upon which the oven is located.

*Universal winch and hoisting car.* — Arranged transversely beneath the oven is a track 73 upon which travels the winch or hoisting car, and this car comprises a body 74 supported upon trucks 75, and in the body is journaled a drum 76 to which a hoisting cable 77 is attached. The drum 76 is provided with a large gear wheel 78 meshing with a small gear wheel 79 mounted upon a shaft 80, journaled in the body of the winch, said shaft being rotated by a crank (not shown). The winch or hoisting car is anchored to the track 73 by a cable 81 attached to said winch or car, said cable being suitably secured centrally of the track 73.

The hoisting cable 77 passes over a sheave 82 anchored in longitudinal alinement with the roller bearing 59ᵃ, whereby said hoisting cable can be easily attached to the oven base and car for moving the same from the rail 68 to the rails 51. The end of the hoisting cable 77 is attached to the hook 37 heretofore mentioned in connection with the detachable oven plate and car, this hook being temporarily held by the keeper 36 of the casing 33 secured to the body of the oven base and car.

*Controlling and operating mechanisms.* — Journaled transversely at the rear side of the oven are shafts 83 upon which are mounted drums 84, and to these drums are attached cables 85, supporting an oblong weight 86. Mounted upon the shaft 83 is a beveled gear wheel 87 meshing with a similar gear wheel 88, carried by a longitudinal shaft 89 (see Fig. 6), journaled in hangers 90, arranged at one side of the oven frame 5.

Figure 1:
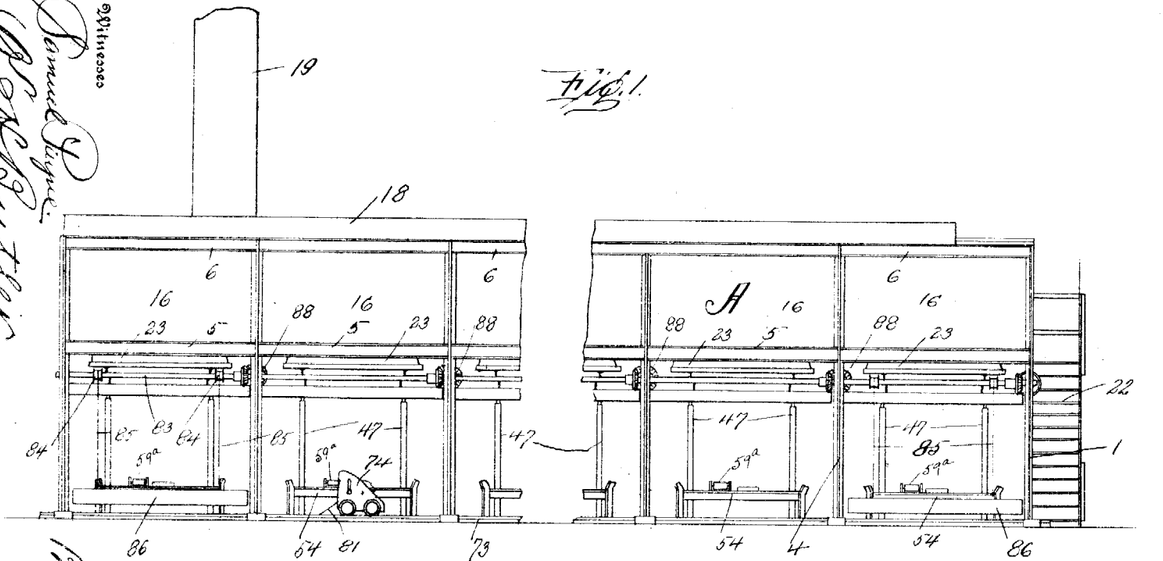
—Figure 1 is an elevation of a series of coke ovens constructed in accordance with my invention.
Figure 2:
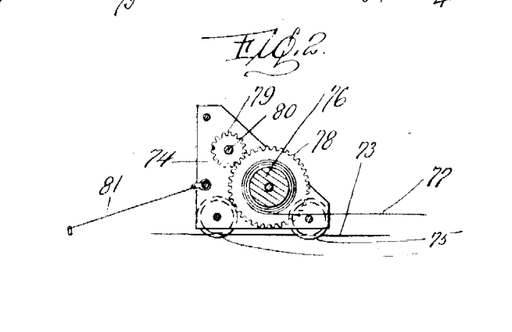
Fig. 2 is a vertical sectional view of a winch or hoisting car.
Figures 3, 4:
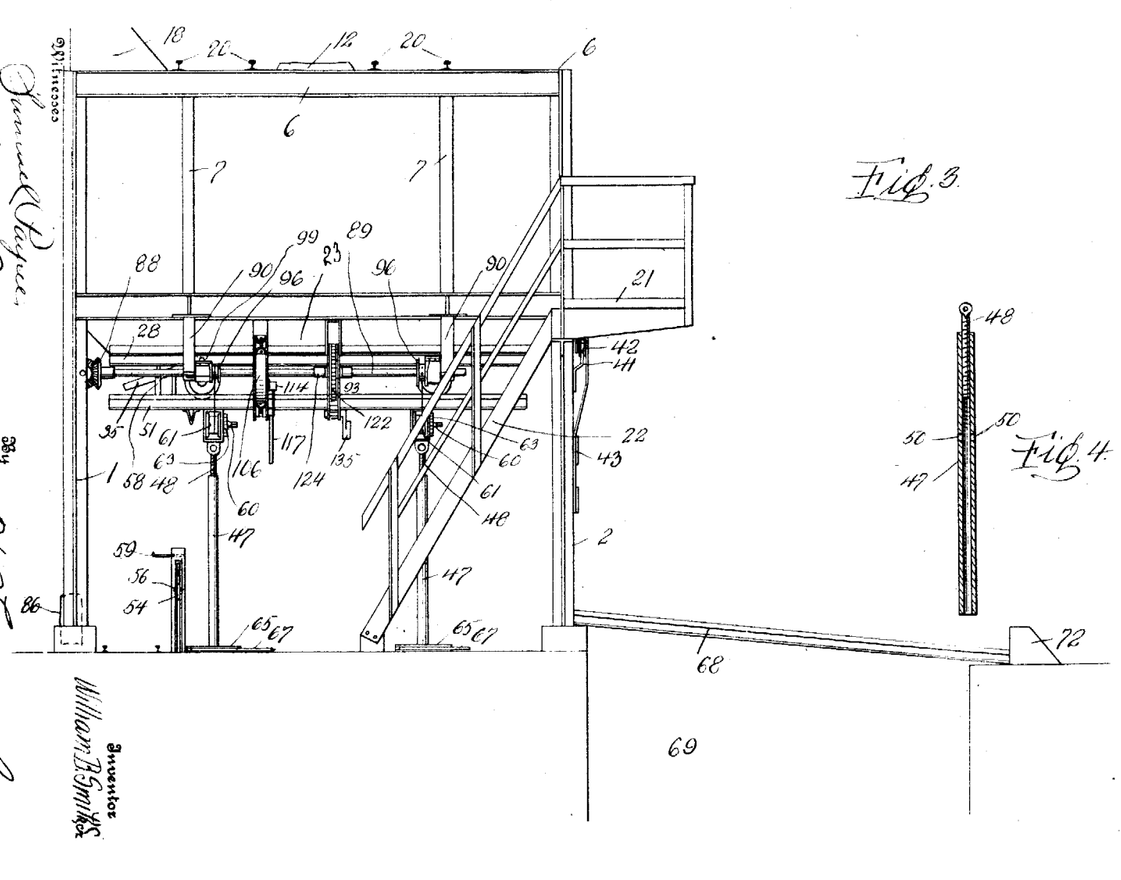
Fig. 3 is a side elevation of one of the ovens.
Fig. 4 is a vertical sectional view of one of the adjustable supports of the detachable oven base.
Figure 5:
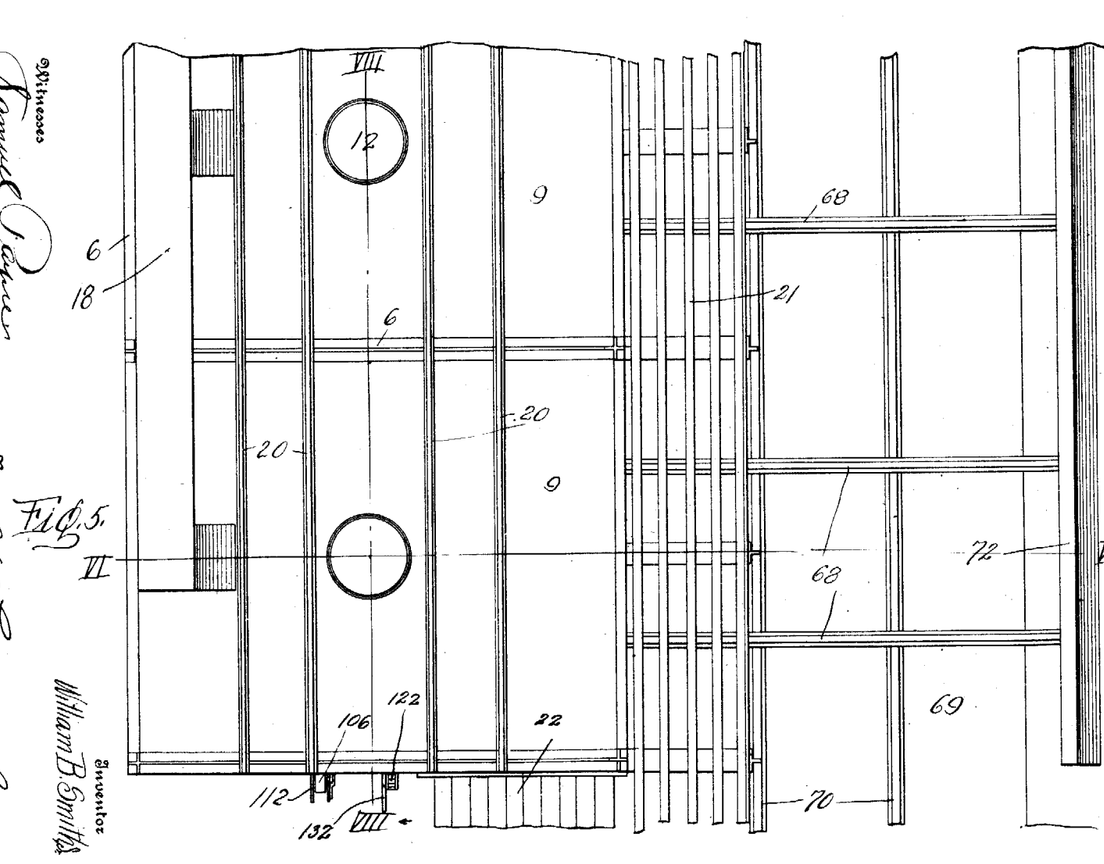
Fig. 5 is an enlarged plan of a portion of the series of ovens illustrating one complete oven.

Before further describing the controlling and operating mechanism, I desire to call attention to the arrangement of the shafts 83, weights 86, and shafts 89 of the series of ovens, as shown in Fig. 1 of the drawings. The shaft 83 will extend from one end of the row of ovens to the opposite end, and it will be only necessary to use two of the weights 86, one in connection with each of the end ovens. With a single oven it is necessary to use two longitudinal shafts 89, one upon each side of the oven, but with a series of ovens a longitudinal shaft can be dispensed with by arranging the single shaft between the ovens and providing said shaft with double clutches, as will presently appear.

I will first describe the longitudinal shafts 89 located at the ends of the series of ovens, and then the shafts intermediate the ovens. Each shaft is provided with single clutches 91, a brake mechanism 92, and a locking mechanism 93, these mechanisms constituting the means employed for controlling the operation of the ovens. The single clutch 91 comprises a block 94 fixed upon the shaft 89, said block having a sleeve 95 for a revoluble spool 96, the side of said spool confronting block 94 having a lug 97 adapted to be engaged by a pin 98, carried by an arm 99, pivotally connected to the block 94, as at 100. The pivoted arm 99 is slotted, as at 101, and extending through said slot is a set screw 102, employed for locking the arm in a fixed position, with the pin 98 in or out of engagement with the lug 97. The hoisting cables 62 upon the outer sides of the end ovens are attached to the spools 96, and assuming that the shaft 89 is rotated, and the pins 98 engage the lugs 97 of the single clutches 91, the hoisting cables 62 can be wound upon the spools 96. The pivoted arms 99 are provided with depending handles 103 whereby the single clutches can be easily manipulated by an operator beneath the ovens.

The brake mechanism 92 comprises a brake wheel 104, keyed upon the shaft 89, as at 105. Adapted to engage the brake wheel 104 is a brake band 106 supported from a hanger 107 carried by the frame 5 of the oven. One end of the brake band 106 is pivotally connected to the crank 108 of a shaft 109, while the opposite end thereof is pivotally connected to an eccentric strap 110 surrounding an eccentric 111, carried by the shaft 109. The shaft 109 is journaled in side frames 112 suspended from the hanger 107. The side frames 112 are cut away, as at 113, to clear the shaft 89, and one of said side frames is provided with a strap 114 for a pivoted pawl 115, said parts engaging a semicircular rack 116 carried by a lever 117 mounted upon the end of the shaft 109. The lever 117 extends downwardly whereby an operator can easily manipulate the brake mechanism, and the pawl 115 is provided with a cable 118, to permit of said pawl being easily raised.

Figures 13, 14, 15, 16, 17, 18:
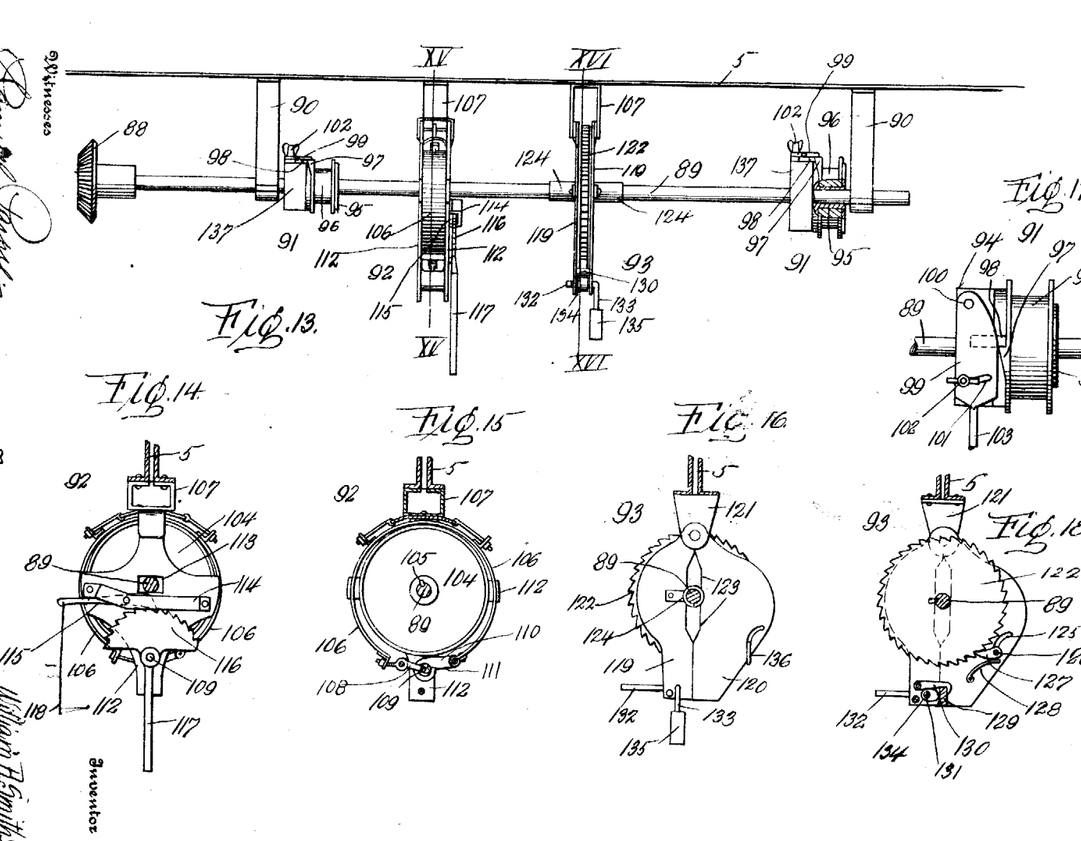

By reference to Figs. 14 and 15, it will be observed that when the lever 117 is swung to the left that the brake band 106 is immediately placed in engagement with the brake wheel 104, and the rotation of the shaft 89 can be easily controlled. The pawl 115 is employed for locking the brake band 106 in engagement with the brake wheel 104.

The locking mechanism 93 comprises hinged members 119 and pivoted members 120, said members being suspended from a hanger 121 carried by the frame 5 of the oven. The members 119 and 120 are arranged upon the sides of the ratchet wheel 122 mounted upon the shaft 89, said members being cut away, as at 123, to clear said shaft. The members 119 are provided with straps 124 surrounding the shaft 89, whereby said members 119 cannot move with respect to said shaft. The members 120 are provided with oppositely disposed segment-shaped slots 125, and loosely mounted in said slots is a transverse pin 126 carrying a pawl 127 normally held in engagement with the ratchet wheel 122 by a spring 128. The lower ends of the members 120 are connected by a transverse beveled bar 129 adapted to be engaged by a hook 130 pivotally mounted between the ends of the members 119. Journaled in the lower ends of the members 119 is a shaft 131 having cranks 132 and 133, also a cam 134 for engaging the hook 130 and elevating the same. The crank 132 serves as a lever for releasing the hook 130, while the crank 133 is provided with a weight 135 for normally maintaining said cam 134 out of engagement with the hook 130.

The locking mechanism 93 is employed for locking the shafts 89 and 83, whereby the descend of the weights 86 cannot rotate said shafts. When the hooks 130 are elevated to free the members 120, the ratchet wheel 122 has a tendency to swing the members 120 outwardly, and the spring 128 will immediately force the pawl 127 to the upper ends of the slots 125, and the pawl 127 will hang out of engagement with the ratchet wheel 122 and the spring 128. To restore the pawl 127 and the spring 128 to the normal position, the transverse pin 126 protrudes from one of the slots 125 and is bent downwardly to provide a handle 136.

The longitudinal shafts 89 between the ovens are provided with double clutches 137, these clutches being constructed similar to the clutches 91 with the exception that each clutch is provided with two pivoted arms 99, each of which is capable of being located in a fixed position, as heretofore described. To the spools 96 of the double clutches are attached the hoisting cables 62 of the confronting sides of the oven bases and cars of two adjoining ovens.

*General operation.*—Assuming that the series of ovens illustrated in Fig. 1 of the drawings is in operation, and it is desired to remove the coke from the oven which I have designated A; with the oven base or car in an elevated position, the locking levers 67 are closed, retaining the adjustable supports 47 above the plate 45 of the well 44. The double clutches 137 are neutral, the brake mechanism 92 and the locking mechanism 93 are released, and the entire mechanism throughout the series of ovens is in condition to permit of the coke being removed from the oven A.

The first step taken by the operator is to set and lock the brake mechanism at either end of the series of ovens. The operator then proceeds to the oven A and opens the locking levers 67, and sets the double clutches 137, whereby the hoisting cables 62 will unwind from the spools 96 and the cables 85 will wind upon the drums 87 of the shaft 83, elevating the weights 86 when the oven base and car descends. The operator then returns to the brake mechanism, releases the pawl 115 and controls the descend of the oven base and car through the medium of the lever 117.

Figures 6, 7:
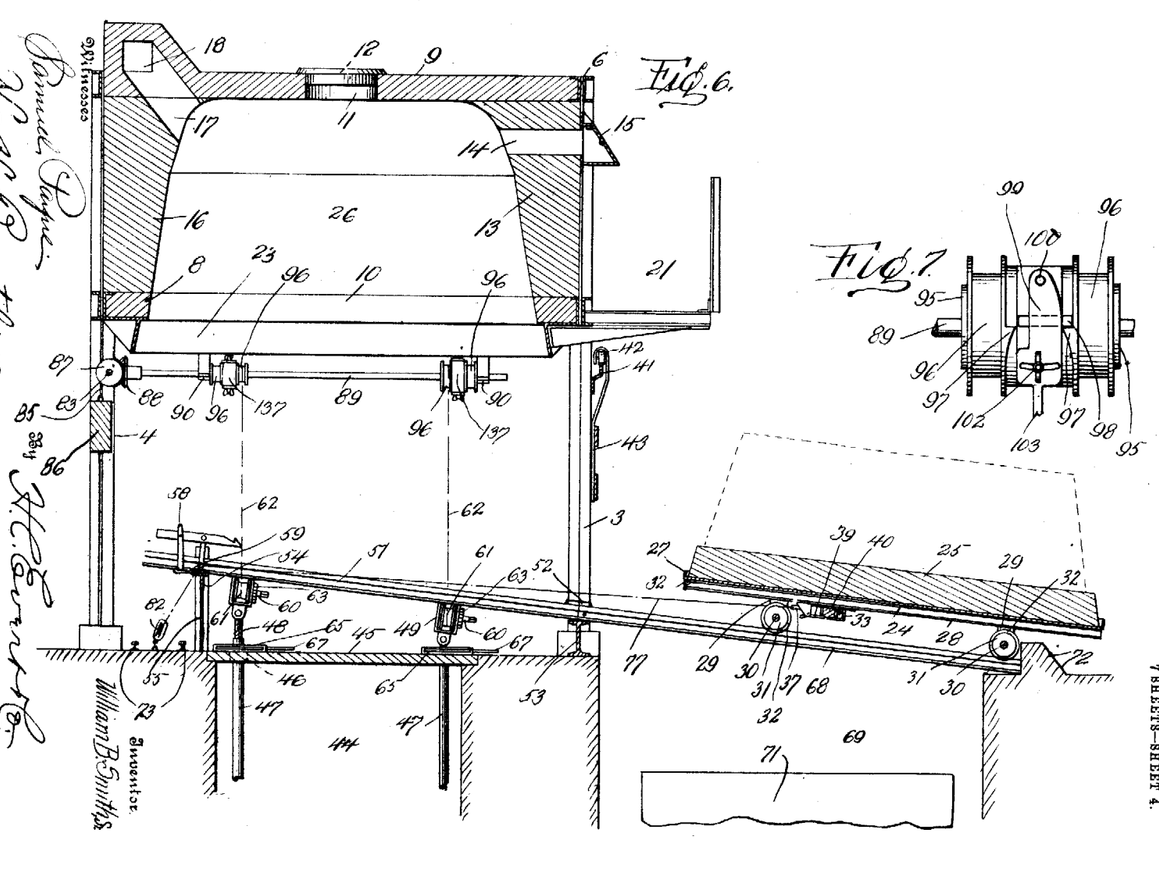
Fig. 6 is a longitudinal sectional view of one of the ovens taken on the line VI of Fig. 5.
Fig. 7 is a detail view of a double clutch forming part of the controlling and operating mechanism.
Figure 8:
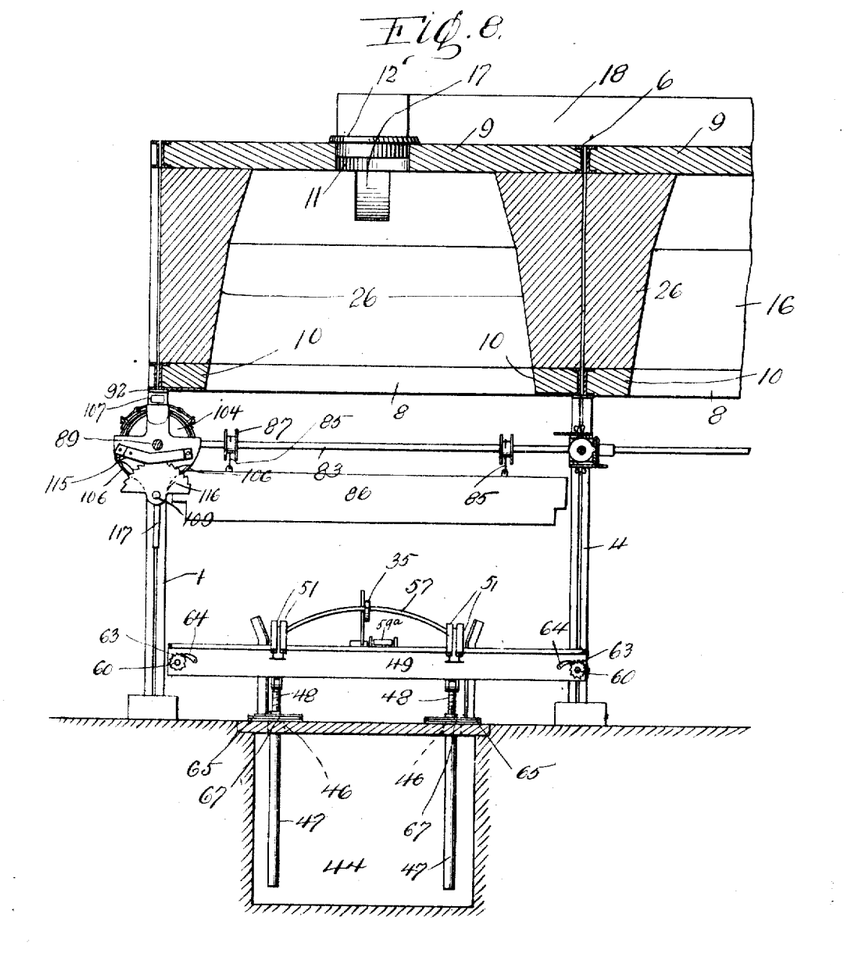
Fig. 8 is a cross sectional view of one of the ovens taken on the line VIII of Fig. 5 looking in the direction of the arrow of said figure.
Figure 9:
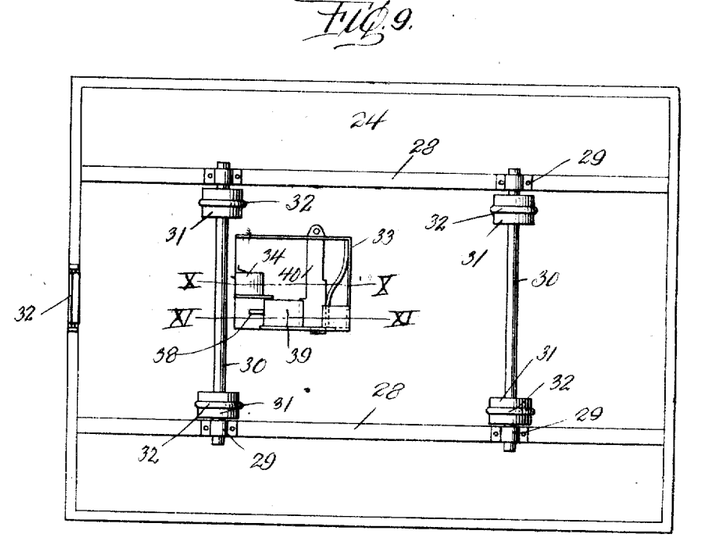
Fig. 9 is a bottom plan of a detachable oven base and car.
Figure 10:
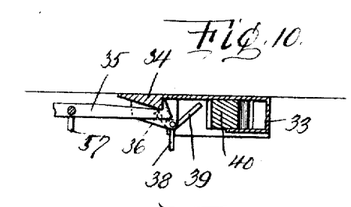
Fig. 10 is a longitudinal sectional view taken on the line X—X of Fig. 9, illustrating a combined lock and tripping mechanism carried by the detachable oven base.
Figure 11:
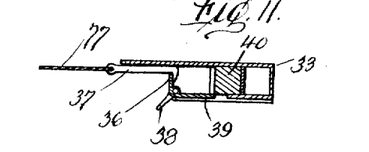
Fig. 11 is a similar view taken on the line XI of Fig. 9.
Figure 12:
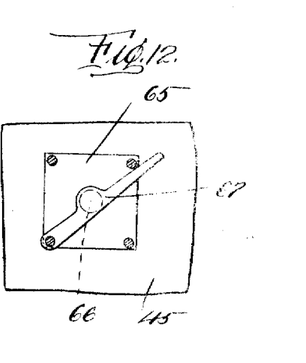
Fig. 12 is a detail in side elevation of one of the locks used in connection with the adjustable oven base supports.

With the oven base and car in the elevated position shown in Fig. 1, the lever 35 (see Fig. 6) is held in engagement with the keeper 34, and as the oven base and car descend and assume an inclined position, the pivoted gravity pawl 58 (see Fig. 6) impinges the ledge 59, tripping the hook-shaped end of the lever 35, releasing the oven base and car. Immediately upon the release of the oven base and car, said base and car move on to the rails 68, to the position illustrated in Fig. 6 of the drawings. The operator or one of his assistants now swings the gate 43 into position to strip the oven base and car of the coke when the same is drawn back to the rails 51. Before the oven base and car pass on to the rails 68, the operator locks the brake mechanism 92, whereby the elevated weights 86 cannot immediately return the elevator to an elevated position. To return the oven base and car to the elevator, the winch or hoisting car is now brought into use and is anchored centrally of the track 73 a short distance from the oven A, the sheave 82 is anchored centrally of the track 73 in alinement with the roller bearing 59ª, as heretofore described, and the hook 37 of the cable 77 is attached to the oven base and car, as illustrated in Figs. 6 and 11 of the drawings. When the shaft 80 of the winch or hoisting car is rotated, the oven base and car is moved upon the elevator and the hook-shaped lever 35 automatically keyed by the keeper 34 to the locking and tripping mechanism of the oven base and car. When the car is returned to the elevator, the latch 32 will engage and shift the upper end of the gravity arm 58 and swing the lower end of said arm inwardly upon the ledge 59 and thereby retain the hook-shaped end of the lever 35 in an elevated position to engage the keeper 34 and ride downwardly under the back of the keeper. The depth of the keeper 34 is not sufficient to place the arm 58 in a vertical position, as the hook-shaped lever engages the same, consequently while the car is on the elevator, the arm 58 will be in an inclined position and only assume a vertical position when the car is off the elevator as shown in Fig. 6. The hook-shaped lever 35 not only engages the keeper 34 but impinges the arm 40, releases the extension 39, and the hook 37 is pulled out of engagement with the keeper 36. The oven base and car is now located upon the elevator and the winch and hoisting car can be moved for use in connection with another oven. The operator gradually releases the brake mechanism and the elevator moves upwardly as the weights 86 descend. After the oven base and car have entered the opening 10 surrounded by flanges 23, the locking levers 67 are thrown into position to engage the lower ends of the supports 47 and prevent an oven base and car from descending while the oven is being refilled and during the production of coke.

While in the drawings forming a part of this application there is illustrated the preferred embodiments of my invention, it is to be understood that the elements therein can be varied or changed as to shape, proportion and exact manner of assemblage without departing from the spirit of the invention.

Having now described my invention what I claim as new, is:—

1. A coke oven embodying standards, horizontal superimposed frames supported thereby, a non-fusible oven structure carried by said frames and having a bottom opening formed therein, depending flanges surrounding said opening, an elevator beneath said structure, said elevator comprising adjustable supports, beams carried thereby, drums adjustably mounted in said beams, rails supported by said beams; a detachable oven base movably mounted upon said rails and adapted to be supported in engagement with the flanges of said oven structure, a combined locking and tripping mechanism carried by the bottom of said oven base, a hook-shaped lever carried by said elevator and adapted to be engaged by said mechanism for retaining said oven base upon said elevator, tracks arranged at one side of said oven for receiving said oven base from said elevator, a gate movably supported by said standards for stripping coke from said base, a hoisting car movable with respect to said oven, a hoisting cable connecting with said car and adapted to be engaged by said locking and tripping mechanism for placing said oven base upon said elevator, said mechanism including means for automatically releasing said hoisting cable, shafts supported longitudinally of said oven, shafts supported transversely of said oven, a weight suspended from said transverse shaft and adapted to be elevated thereby, clutch mechanisms located upon said longitudinal shafts, said clutch mechanisms comprising spools, cables connecting said spools with the drums of said elevator, a brake mechanism carried by one of said longitudinal shafts, and a locking mechanism carried by the same shaft, substantially as described.

2. A coke oven embodying standards, horizontal superimposed frames supported thereby, a non-fusible oven structure carried by said frames and having a bottom opening formed therein, an elevator beneath said structure, said elevator comprising adjustable supports, beams carried thereby, drums adjustably mounted in said beams, rails supported by said beams; a detachable oven base movably mounted upon said rails and adapted to be supported in engagement with said oven structure, a combined locking and tripping mechanism carried by the bottom of said oven base, a hook-shaped lever carried by said elevator and adapted to be engaged by said mechanism for retaining said oven base upon said elevator, tracks arranged at one side of said oven for receiving said oven base from said elevator, a gate movably supported by said standards for stripping coke from said base, a hoisting car movable with respect to said oven, a hoisting cable connecting with said car and adapted to be engaged by said locking and tripping mechanism for placing said oven base upon said elevator, shafts supported longitudinally of said oven, shafts supported transversely of said oven, a weight suspended from said transverse shaft and adapted to be elevated thereby, clutch mechanisms located upon said longitudinal shafts, said clutch mechanisms comprising spools, cables connecting said spools with the drums of said elevator, a brake mechanism carried by one of said longitudinal shafts, and a locking mechanism carried by the same shaft.

3. A coke oven embodying horizontal superimposed frames, a non-fusible oven structure carried by said frames and having a bottom opening formed therein, an elevator beneath said structure, said elevator comprising adjustable supports, beams carried thereby, drums adjustably mounted in said beams, rails supported by said beams; a detachable oven base movably mounted upon said rails and adapted to be supported in engagement with said oven structure, a combined locking and tripping mechanism carried by the bottom of said oven base, a hook-shaped lever carried by said elevator and adapted to be engaged by said mechanism for retaining said oven base upon said elevator, tracks arranged at one side of said oven for receiving said oven base from said elevator, a gate arranged beneath said oven structure for stripping coke from said base, a hoisting car movable with respect to said oven, a hoisting cable connecting with said car and adapted to be engaged by said locking and tripping mechanism for placing said oven base upon said elevator, shafts supported longitudinally of said oven, shafts supported transversely of said oven, a weight suspended from said transverse shaft and adapted to be elevated thereby, clutch mechanisms located upon said longitudinal shafts, said clutch mechanisms comprising spools, cables connecting said spools with the drums of said elevator, and a brake mechanism carried by one of said longitudinal shafts.

4. A coke oven embodying horizontal superimposed frames, a non-fusible oven structure carried by said frames and having a bottom opening formed therein, an elevator beneath said structure, said elevator comprising adjustable supports, beams carried thereby, drums adjustably mounted in said beams, rails supported by said beams; a detachable oven base movably mounted upon said rails and adapted to be supported in engagement with said oven structure, a combined locking and tripping mechanism carried by the bottom of said oven base, a hook-shaped lever carried by said elevator and adapted to be engaged by said mechanism for retaining said oven base upon said elevator, tracks arranged at one side of said oven for receiving said oven base from said elevator, a gate arranged beneath said oven structure for stripping coke from said base, a hoisting car movable with respect to said oven, a hoisting cable connecting with said car and adapted to be engaged by said locking and tripping mechanism for placing said oven base upon said elevator, means for moving said elevator, and means for locking said elevator in a fixed position.

5. A coke oven embodying superimposed frames, an oven structure carried by said frames and having a bottom opening formed therein, an elevator beneath said structure, said elevator comprising supports and rails; a detachable oven base movably mounted upon said elevator and adapted to close said opening, and adapted to move from beneath said structure, a combined locking and tripping mechanism carried by said oven base, means engaging said mechanism for holding said base upon said elevator, means actuated by the lowering of said elevator to release said base, means operatable in connection with said mechanism for moving said base on to said elevator, means for moving said elevator and means for locking said elevator in a fixed position.

6. A coke oven embodying superimposed frames, an oven structure carried by said frames and having a bottom opening formed therein, a detachable oven base for closing said oven, an elevator arranged beneath said structure for moving said oven base, rails arranged adjacent to said elevator to receive said oven base, means for normally holding said oven base upon said elevator, means actuated by a lowering movement of said elevator for releasing said base and allowing said base to move on to said rails, means detachably connected to said oven base for moving said oven base on to said elevator, and means arranged at one side of said structure for stripping coke from said base when moved to said elevator, means for moving said elevator, and means for locking said elevator in a fixed position.

7. A coke oven embodying superimposed frames, an oven structure carried by said frames and having a bottom opening formed therein, a detachable oven base for closing said oven, an elevator arranged beneath said structure for moving said oven base, rails arranged adjacent to said elevator to receive said oven base, means for normally holding said oven base upon said elevator, means actuated by a lowering movement of said elevator for releasing said base and allowing said base to move on to said rails, means detachably connected to said oven base for moving said oven base on to said elevator, means arranged at one side of said structure for stripping coke from said base when moved to said elevator, and means for moving said elevator.

8. A coke oven comprising superimposed frames, an oven structure carried by said frames and having a bottom opening formed therein, a detachable oven base for closing said opening, an elevator arranged beneath said structure for raising and lowering said base, rails arranged at one side of said structure and adapted to receive said base from said elevator, means actuated by the lowering of said elevator for allowing said base to move on to said rails, means detachably connected to said base for moving said base from said rails to said elevator, means for locking said base upon said elevator, means for moving said elevator, and means for locking said elevator in a fixed position.

9. A coke oven comprising superimposed frames, an oven structure carried by said frames and having a bottom opening formed therein, a detachable oven base for closing said opening, an elevator arranged beneath said structure for raising and lowering said base, rails arranged at one side of said structure and adapted to receive said base from said elevator, means actuated by the lowering of said elevator for allowing said base to move on to said rails, means detachably connected to said base for moving said base from said rails to said elevator, means for locking said base upon said elevator, and means for moving said elevator.

10. An oven comprising superimposed frames, an oven structure carried thereby and having a bottom opening formed therein, an oven base for closing said opening, an elevator for moving said oven base, rails arranged at one side of said structure to receive said base from said elevator, an adjustable means arranged at one side of said structure for stripping coke from said base when moved back on to said elevator, and means for controlling the operation of said elevator.

In testimony whereof I affix my signature in the presence of two witnesses.

WILLIAM B. SMITH, Sr.

Witnesses:
- THOMAS E. SMITH,
  K. H. BUTLER.